United States Patent
Bhat et al.

(10) Patent No.: US 6,871,904 B2
(45) Date of Patent: Mar. 29, 2005

(54) COMPOSITE PICKUP BOX FOR AUTOMOTIVE VEHICLE

(75) Inventors: Ramkrishna Vijay Bhat, Inkster, MI (US); Jason Allan Marable, Chesterfield, MI (US); Cliff Robert Reitzloff, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 10/604,152

(22) Filed: Jun. 27, 2003

(65) Prior Publication Data

US 2004/0262950 A1   Dec. 30, 2004

(51) Int. Cl.$^7$ .............................................. B60D 33/00
(52) U.S. Cl. ................... 296/183.1; 296/184.1; 296/191; 52/588.1
(58) Field of Search ................... 296/183.1, 39.2, 296/36, 204, 181, 183, 182.1, 184.1, 191, 296/186.1; 360/246.2; 52/588.1, 656.1; 29/897.2; 239/750; 440/61 R

(56) References Cited

U.S. PATENT DOCUMENTS

| | | | | |
|---|---|---|---|---|
| 1,913,342 A | * | 6/1933 | Schaffert | 52/588.1 |
| 2,458,686 A | * | 1/1949 | Davie Jr. | 29/897.2 |
| 2,753,018 A | * | 7/1956 | Curell | 296/191 |
| 2,786,556 A | * | 3/1957 | Constance, Jr. | 52/588.1 |
| 2,952,341 A | * | 9/1960 | Weiler | 52/588.1 |
| 3,043,407 A | * | 7/1962 | Marryatt | 52/588.1 |
| 3,100,556 A | * | 8/1963 | De Ridder | 52/588.1 |
| 3,116,950 A | * | 1/1964 | Chieger et al. | 296/184.1 |
| 3,128,851 A | * | 4/1964 | Deridder et al. | 52/588.1 |
| 3,380,216 A | * | 4/1968 | Spence | 296/184.1 |
| 3,555,762 A | * | 1/1971 | Costanzo, Jr. | 52/588.1 |
| 3,556,583 A | * | 1/1971 | Ellard | 296/191 |
| 3,705,732 A | * | 12/1972 | Marinelli | 296/184.1 |
| 3,886,705 A | * | 6/1975 | Cornland | 52/588.1 |
| 3,974,616 A | * | 8/1976 | Beckley | 52/656.1 |
| 4,222,606 A | | 9/1980 | Brown et al. | |
| 4,325,488 A | | 4/1982 | Ketner | |
| 4,596,347 A | | 6/1986 | Hite | |
| 4,631,891 A | * | 12/1986 | Donavich | 52/588.1 |
| 4,758,128 A | * | 7/1988 | Law | 52/588.1 |
| 4,809,479 A | * | 3/1989 | Tierno et al. | 52/588.1 |
| 4,951,992 A | * | 8/1990 | Hockney | 296/184.1 |
| 5,052,741 A | * | 10/1991 | Brown et al. | 296/186.1 |
| 5,170,605 A | * | 12/1992 | Huddle | 52/588.1 |
| 5,267,515 A | * | 12/1993 | Tsuruda et al. | 296/191 |
| 5,687,895 A | | 11/1997 | Allison et al. | |
| 5,711,444 A | | 1/1998 | Meacham et al. | |
| 5,719,726 A | * | 2/1998 | Hayakawa | 360/246.2 |
| 5,791,726 A | | 8/1998 | Kaufman | |
| 6,174,023 B1 | * | 1/2001 | Booher | 296/184.1 |
| 6,189,962 B1 | | 2/2001 | Henderson | |

(Continued)

Primary Examiner—Kiran Patel
(74) Attorney, Agent, or Firm—Gigette M. Bejin

(57) ABSTRACT

A composite pickup box for an automotive vehicle is constructed of extruded floor beams combined with extruded wall sections and extruded corner sections. An outer skin is attached to the wall sections in such manner as to cover the exterior portions of the wall sections and corner sections.

10 Claims, 3 Drawing Sheets

U.S. PATENT DOCUMENTS 6,224,142 B1 * 5/2001 McCormack ............... 296/191
6,425,626 B1 * 7/2002 Kloepfer .................. 296/186.1
6,431,475 B1 * 8/2002 Williams ................... 239/750
6,439,649 B1 * 8/2002 Lorenzo et al. .......... 296/183.1
6,454,620 B1 * 9/2002 Theisen et al. ........... 440/61 R
6,513,297 B2 * 2/2003 Kloepfer .................... 52/588.1

* cited by examiner

COMPOSITE PICKUP BOX FOR AUTOMOTIVE VEHICLE

BACKGROUND OF INVENTION

1. Field of the Invention

The present invention relates to a composite pickup box for an automotive vehicle having a plastic skin over a metallic or non-metallic or composite structural unit.

2. Disclosure Information

Vehicle designers have been driven for years to develop cargo carrying bodies or boxes which have the attributes of being light in weight but strong and economical to build, while at the same time offering the capability of changing the configuration of the pickup box or cargo carrying structure, without excessive cost. U.S. Pat. No. 5,791,726 discloses a stakeless livestock trailer including stacked and interlocked extruded tubular members for sidewalls and a extruded plank flooring system. A problem with the construction of the trailer of the '726 patent resides in the fact that the appearance of the trailer is generally not be suitable for use in the pickup box of a automotive vehicle. A pickup box according to the present invention may be fabricated without the need for extensive fixed tooling. This in turn allows several configurations to be easily and quickly produced.

SUMMARY OF INVENTION

A composite pickup box for an automotive vehicle includes a floor with a plurality of extruded beams, with each of the beams having a plurality of downward opening channels, and plurality of wall sections. Each wall section includes at least one unitary extrusion having a plurality of outward opening channels. Each of the wall sections is permanently joined to the floor, either by welding, bonding or other means. Finally, an outer skin attached to the plurality of wall sections covers the wall sections, including the outward opening channels.

A pickup truck box according to present invention may include floor and wall sections formed from extruded metal or non-metallic materials such aluminum or fiber-filled resin, such as glass or carbon fiber bearing resins. In addition to floor and wall sections, a composite pickup box for an automotive vehicle according to the present invention further includes a plurality of extruded corner posts extending vertically from the floor of the pickup box at the plurality of corners of the pickup box. At least two of the wall sections are joined to corner posts. Each corner post includes an outwardly directed closed quadrant and an inwardly directed open quadrant opposing the closed quadrant. The wall sections are joined to the outer surfaces of the inwardly directed quadrants. In this manner, the welding or other bonding process used to join the wall surfaces of the corner posts will not be visible from the interior of the pickup box.

According to another aspect of the present invention, a method for constructing a pickup box for an automotive vehicle includes the steps of extruding at least one floor panel having a plurality of downward opening channels, extruding a plurality of wall sections, with each section having a plurality of outward opening channels, and extruding a plurality of corner posts, with each post having an outwardly directed closed quadrant opposing an inwardly directed open quadrant. The present method further includes the steps of welding the wall sections to the floor panels and welding the wall sections to the corner posts so that the wall sections are rigidly supported and capable of withstanding the abuse normally encountered with pickup truck boxes.

It is an advantage of a pickup box according to the present invention that the extruded, multi-piece structural assembly is light in weight. It is the further advantage of the present invention that present pickup box requires a minimum tooling for its construction.

It is yet a further advantage of the present invention that the present pickup box may be constructed of metallic or non-metallic extrudates.

It is yet a further advantage of the present invention that the configuration and size of the present pickup box may be easily changed without incurring more than minimal tooling cost.

Other advantages, as well as objects and features of the present invention, will become apparent to the reader of this specification.

DETAILED DESCRIPTION

Figure 1:
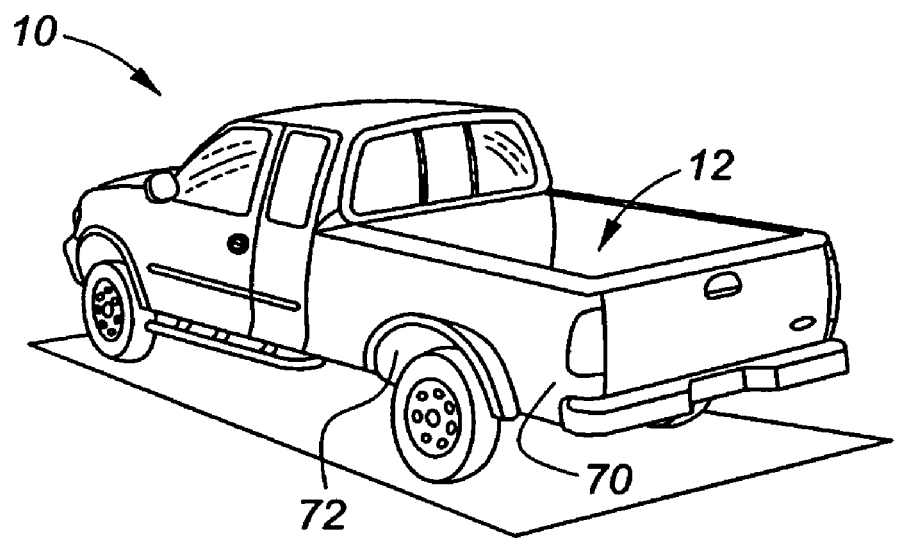
FIG. 1 illustrates a pickup truck having a composite cargo box according to the present invention.

As shown in FIG. 1, vehicle 10 has a composite cargo box 12 to the present invention. The terms 'pickup box' and 'cargo box' are used interchangeably herein to mean a load carrying structure mounted upon and extending across the rear portion of the chassis of a light or medium vehicle. And, 'composite' means that cargo box 12 is made from a plurality of materials.

Figure 2:
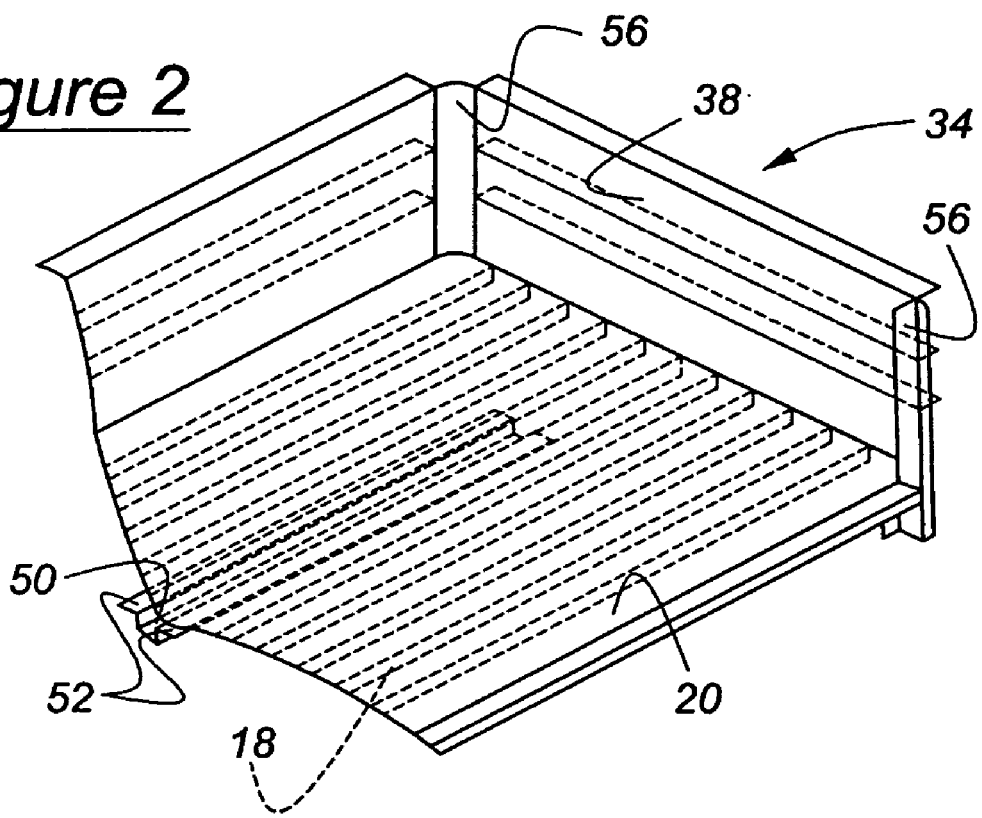
FIG. 2 is a perspective view of a cargo box as shown in FIG. 1.
Figure 3:
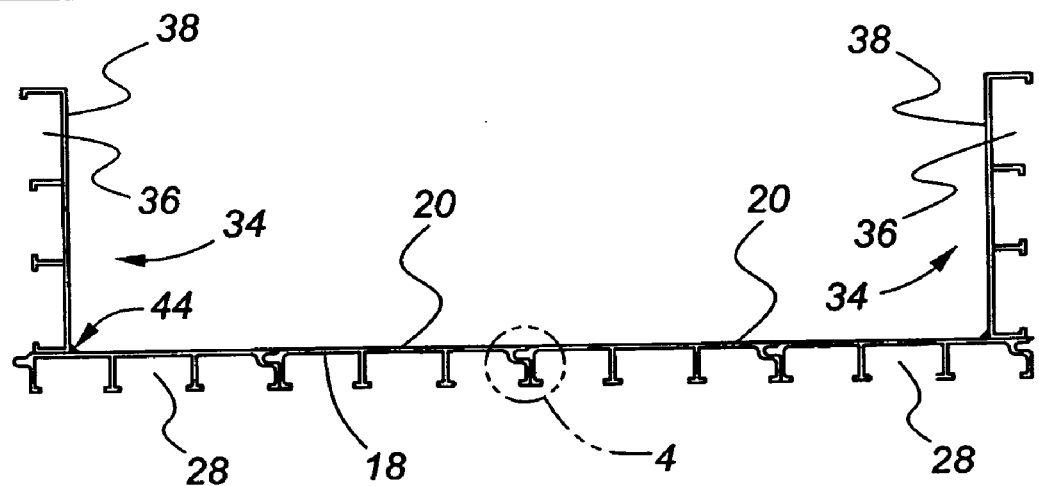
FIG. 3 is a sectional view of a pickup box of FIG. 1.
Figure 4:
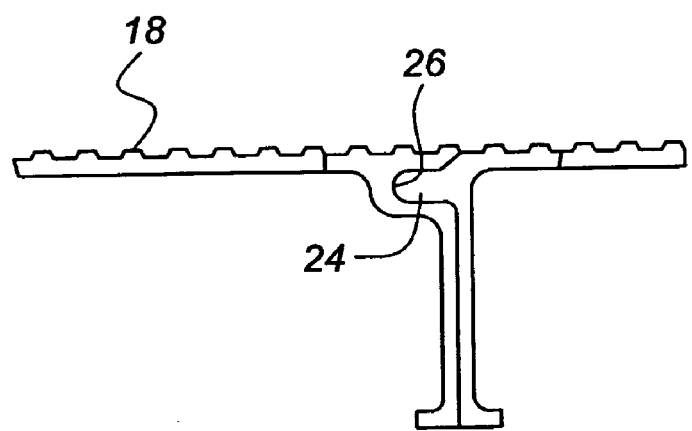
FIG. 4 is a broken away section of two extruded, interlocking floor members used in the present cargo box.

The extruded, multi-piece structure of the pickup box 12 is comprised of the members shown in FIG. 2. A plurality of extruded floor beams 18 are joined together to form the cargo carrying surface of pickup box 12. As shown in FIGS. 2 and 3, each of extruded floor beams 18 has a load-bearing surface 20 formed therein, and a plurality of channels 28 which open downwardly. Extruded floor beams 18 are joined by means of tongue and groove structures with tongue 24 and groove 26 shown with particularity in FIG. 4. As it is further shown in FIG. 2, a plurality of cross members 50 is provided underneath extruded floor beams 18 so as to provide a structural member for attaching pickup box 12 to a vehicle. Each cross member 50 has a pair of flanges 52 to facilitate welding or bonding cross member 50 to extruded floor beams 18. Cross members 50 may be extruded according to another aspect of the present invention.

FIGS. 2 and 3 further show wall sections 34 as having load containing surfaces 38 and outwardly opening channels 36 (FIG. 3). Wall sections 34 are extruded. Wall sections 34, as well as floor beams 18, may comprise extruded metal such as aluminum or extruded non-metals such as plastics, glass or carbon fiber filled resins, or yet other metallic and non-metallic extrusions. In any event, the structural shapes of the present composite pickup box will be produced profitably by extrusion, and, as noted above, this yields the benefit of lower weight, lower tooling costs, and the potential for lower cost to the consumer.

As shown in FIG. 3, wall sections 34 are positioned to permit rigid attachment to floor beams 18. The particular joining technique employed could include welding, such as that shown at 44, or bonding, or riveting, or yet other types of joining techniques known to those skilled in the art and suggested by this disclosure. Wall sections 34 are used for both the sides and the front of a pickup box according to the present invention.

Figure 5:
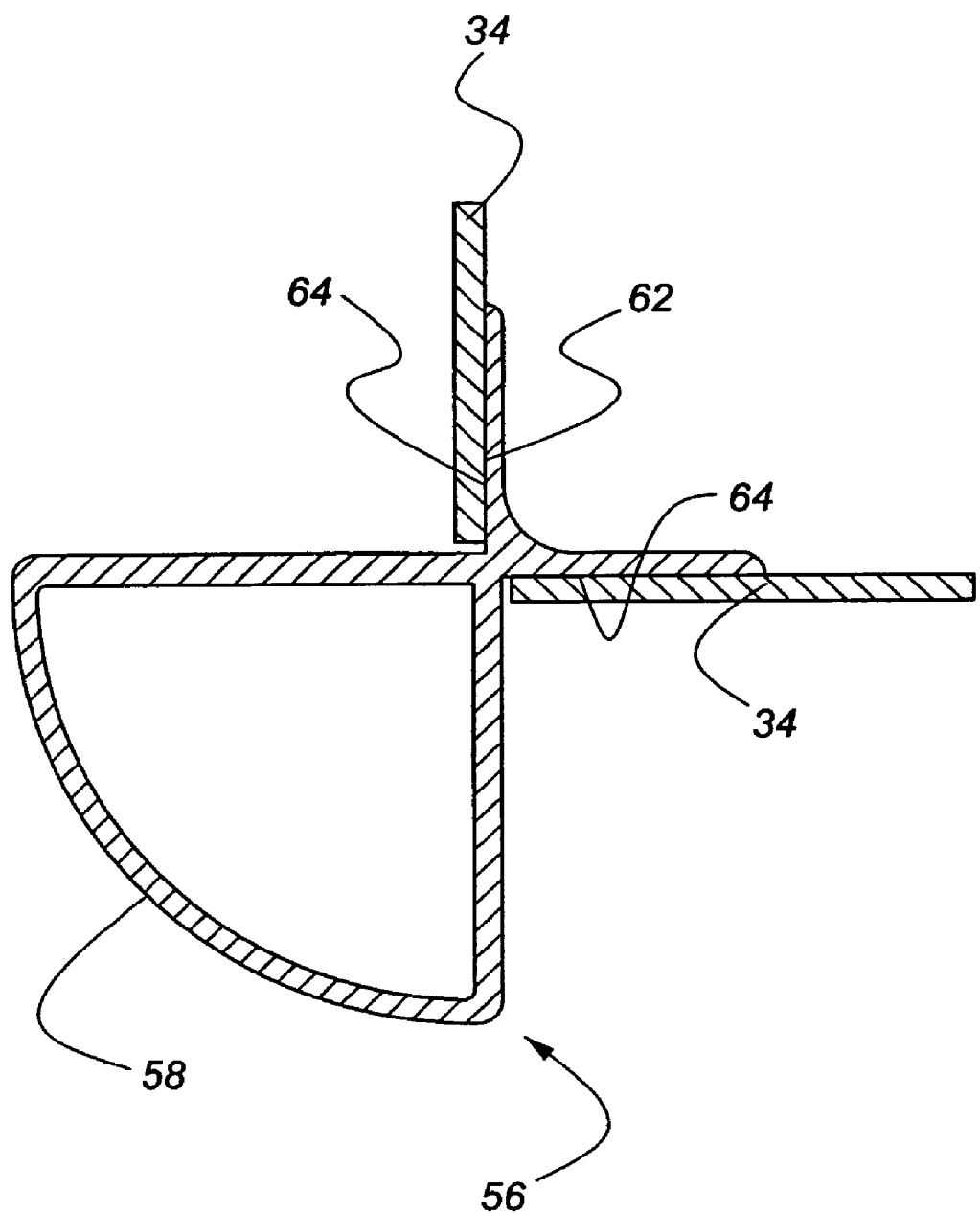
FIG. 5 illustrates an extruded corner post according to an aspect of the present invention.

Turning now to FIG. 5, which is a bird's-eye view of a front corner of pickup box 12, corner posts 56 provide a very rigid means for joining wall sections 34 at a corner. As shown in FIG. 5, each corner post 56 includes an outwardly directed closed quadrant 58 which faces to the outside of the pickup box, and an inwardly directed open quadrant 62 which faces to the inside of the pickup box. Wall sections 34 are or bonded to the outer surfaces 64 of inwardly directed open quadrant 62. Because wall sections 34 are preferably welded to the outer surfaces 64 of the open quadrant 62, the welding need not be evident from an inspection of the interior of the completed box. Those skilled in the art will appreciate in view of this disclosure that various joining techniques such as welding, brazing, riveting, and adhesive bonding could be employed for assembling a structure according to the present invention.

Once the structure of the box has been fabricated from the extruded members, outer skin 70 may be applied over corner posts 56 and wall sections 34. Note that outer skin 70 has a plurality of wheelhouse openings 72 formed therein and that once outer skin 70 has been applied to the pickup box, the channels 36 of wall sections 34 are no longer visible. As a result, the visible, vertically extending interior portions of the pickup box defined by load containing surfaces 38 of wall sections 34, are relatively smooth, and only occasionally seams appear in load bearing surfaces 20 of extruded floor beams 18.

Outer skin 70 may be applied either before or after pickup box 12 has been mounted upon a vehicle chassis. Although outer skin 70 could be constructed of metallic or non-metallic molded or stamped materials commonly employed for the fabrication of automotive exterior panels, in a preferred embodiment skin 70 would be constructed of thermoformed sheets.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A composite pickup box for an automotive vehicle, comprising:
    a floor comprising a plurality of extruded beams, with each of said beams having a plurality of downward opening channels;
    a plurality of wall sections, with each of said wall sections comprising a unitary extrusion having a plurality of outward opening channels, with each of said wall sections being permanently joined to said floor; and
    an unitary outer skin attached to said plurality of wall sections so as to cover said plurality of outward opening channels.

2. The composite pickup box for an automotive vehicle according to claim 1, wherein said floor and said wall sections comprise extruded metal.

3. The composite pickup box for an automotive vehicle according to claim 1, wherein said wall sections are welded to said floor.

4. The composite pickup box for an automotive vehicle according to claim 1, wherein said wall sections are adhesively bonded to said floor.

5. The composite pickup box for an automotive vehicle according to claim 2, wherein said floor and said wall sections comprise extruded aluminum, with said wall sections being welded to said floor.

6. The composite pickup box for an automotive vehicle according to claim 1, wherein said floor and said wall sections comprise extruded plastic.

7. The composite pickup box for an automotive vehicle according to claim 5, wherein said floor and said wall sections comprise extruded, fiber-filled resin.

8. The composite pickup box for an automotive vehicle according to claim 1, further comprising a plurality of extruded corner posts extending vertically from said floor at a plurality of corners of said pickup box, with at least two of said wall sections being joined to said corner posts.

9. The composite pickup box for an automotive vehicle according to claim 6, wherein each of said corner posts comprises an outwardly directed closed quadrant and an inwardly directed open quadrant, with said at least two wall sections being joined to oute surfaces of said inwardly directed quadrants.

10. The composite pickup box for an automotive vehicle according to claim 8, wherein said at least two wall sections are welded to outer surfaces of inwardly directed quadrants of said corner posts such that said welding is not visible from the interior of said pickup box.

\* \* \* \* \*